(12) United States Patent
Kilibarda et al.

(10) Patent No.: US 9,493,201 B2
(45) Date of Patent: Nov. 15, 2016

(54) VEHICULAR BODY ASSEMBLY LOCKING APPARATUS AND METHOD

(71) Applicant: Comau, Inc., Southfield, MI (US)

(72) Inventors: Velibor Kilibarda, West Bloomfied, MI (US); Michael R. Dugas, Brighton, MI (US)

(73) Assignee: Comau, Inc., Southfield, MI (US)

( * ) Notice: Subject to any disclaimer, the term of this patent is extended or adjusted under 35 U.S.C. 154(b) by 0 days.

(21) Appl. No.: 14/489,856

(22) Filed: Sep. 18, 2014

(65) Prior Publication Data

US 2015/0052756 A1 Feb. 26, 2015

Related U.S. Application Data

(60) Division of application No. 13/219,755, filed on Aug. 29, 2011, now Pat. No. 8,839,507, which is a continuation-in-part of application No. 12/969,084, filed on Dec. 15, 2010, now abandoned.

(60) Provisional application No. 61/286,428, filed on Dec. 15, 2009.

(51) Int. Cl.
*B21B 39/14* (2006.01)
*B62D 65/02* (2006.01)
*B62D 65/18* (2006.01)

(52) U.S. Cl.
CPC .......... *B62D 65/022* (2013.01); *B62D 65/024* (2013.01); *B62D 65/026* (2013.01); *B62D 65/18* (2013.01); *Y10T 29/49622* (2015.01);
(Continued)

(58) Field of Classification Search
CPC B62D 65/022; B62D 65/024; B62D 65/026; B62D 65/18
See application file for complete search history.

(56) References Cited

U.S. PATENT DOCUMENTS

| 2,779,092 A | 1/1957 | Gordon et al. |
| 4,827,598 A | 5/1989 | Sakamoto et al. |

(Continued)

FOREIGN PATENT DOCUMENTS

| JP | 05277848 A | 10/1993 |
| JP | 2003145363 A | 5/2003 |

(Continued)

OTHER PUBLICATIONS

Notification of Transmittal, International Search Report and Written Opinion of the International Searching Authority dated Aug. 25, 2011 from the corresponding International Application No. PCT/US2010/060531 filed Dec. 15, 2010.

*Primary Examiner* — Minh Trinh
(74) *Attorney, Agent, or Firm* — Young Basile Hanlon & MacFarlane, P.C.

(57) ABSTRACT

A vehicle body positioning and locking devices for use in assembling a vehicle body positioned on a movable vehicle support positioned at a vehicle build station. The locking device includes a remote vehicle locking device for selectively securing and locking a vehicle body to a support pallet. The support pallet is accurately and precisely positioned at a build station through alignment and inserting engagement of locating pads in at least one four-way and at least one two way receiver mounted to a build station foundation. A compliant body clamp design is included to provide a desired clamping force between the pallet and a vehicle body across a range of motion of the body clamp to accommodate vehicle build variances.

9 Claims, 14 Drawing Sheets

(52) U.S. Cl.
CPC ..... *Y10T29/49829* (2015.01); *Y10T 29/49947* (2015.01); *Y10T 29/5337* (2015.01); *Y10T 29/53313* (2015.01); *Y10T 29/53435* (2015.01); *Y10T 403/39* (2015.01)

(56) References Cited

U.S. PATENT DOCUMENTS

| | | | |
|---|---|---|---|
| 4,893,402 A | 1/1990 | Hirasaka et al. | |
| 4,894,909 A | 1/1990 | Sakamoto et al. | |
| 5,027,502 A | 7/1991 | Sakamoto et al. | |
| 5,943,768 A | 8/1999 | Ray | |
| 6,145,181 A | 11/2000 | Murata et al. | |
| 6,196,372 B1 * | 3/2001 | Rossi | B62D 65/00 198/345.1 |
| 6,505,726 B1 * | 1/2003 | Baulier | B66F 7/02 198/343.2 |
| 6,634,097 B1 * | 10/2003 | Ikeda | B62D 65/00 29/783 |
| 6,825,909 B2 | 11/2004 | Walker et al. | |
| 6,966,421 B2 | 11/2005 | Nakamura | |
| 7,055,240 B2 | 6/2006 | Kelley et al. | |
| 7,469,473 B2 | 12/2008 | Savoy | |
| 7,798,068 B2 * | 9/2010 | Nishihara | B61B 3/02 104/172.4 |
| 8,839,507 B2 | 9/2014 | Kilibarda et al. | |
| 2008/0000068 A1 | 1/2008 | Savoy et al. | |
| 2008/0087201 A1 * | 4/2008 | Henblad | B21D 1/14 108/44 |
| 2008/0116247 A1 | 5/2008 | Kilibarda | |
| 2011/0138601 A1 | 6/2011 | Kilibarda | |
| 2012/0030924 A1 | 2/2012 | Kilibarda et al. | |
| 2013/0082169 A1 | 4/2013 | Kilibarda | |
| 2015/0246700 A1 | 9/2015 | Kilibarda et al. | |

FOREIGN PATENT DOCUMENTS

| | | |
|---|---|---|
| KR | 1020040082843 A | 9/2004 |
| KR | 1020090104442 A | 10/2009 |

* cited by examiner

VEHICULAR BODY ASSEMBLY LOCKING APPARATUS AND METHOD

CROSS-REFERENCE TO RELATED APPLICATIONS

The present divisional application claims priority benefit to U.S. patent application Ser. No. 13/219,755 filed Aug. 29, 2011, U.S. patent application Ser. No. 12/969,084 filed Dec. 15, 2010, and U.S. Provisional Patent Application No. 61/286,428 filed Dec. 15, 2009, the entire contents of these applications are incorporated herein by reference.

TECHNICAL FIELD

The inventive devices and methods are in the general field of manufacture and assembly.

BACKGROUND

Increasing emphasis is placed on the accuracy and precision in manufacturing and assembly process, particularly in the field of passenger vehicles. Demand for higher volumes of vehicles and efficient manufacturing and assembly of such vehicles has also increased further straining the objectives of accuracy, precision and quality of the end product.

In the assembly of passenger vehicles, the building block is the skeletal body, still often made of formed sheet steel components and subassemblies. Modern assembly plants require hundreds of sequential build stations positioned along a progressive assembly line. As the vehicle body is built, it is essential that the vehicle body be accurately and precisely positioned at each individual assembly station so the robots or human operators can accurately and precisely position and mount the components or subassemblies at each station.

Transporting and positioning the vehicle body has been accomplished in many ways. A preferred way is by a moving pallet that has pillars or risers, typically four or six to a pallet, which the skeletal body is positioned and sits atop of as it moves from station to station on the pallet. In order to achieve a predictable and accurate placement of the vehicle body at any one sequential build station, the skeletal vehicle body must first be fixedly positioned to the pallet and then second, the pallet and secured vehicle body, positioned in the predetermined three-dimensional location at a particular build station so that the assembly operations at that station can be carried out. To the extent that a vehicle body must be removed from the pallet at various points along an assembly line, for example, transfer to another pallet for further processing along another assembly line, it is advantageous for the vehicle body to be unlocked or unsecured from the pallet and removed from the pallet.

Various systems and operations for securing a vehicle body to a pallet and locating a pallet at sequential build stations have been proposed. One example is the Single Geometry Palletized Framing System described and illustrated in U.S. patent application Ser. No. 12/257,922 assigned to Comau, Inc., assignee of the present invention, the entire contents of which are incorporated herein by reference.

A disadvantage in prior systems has involved complex hydraulic, pneumatic and other mechanisms secured aboard the moving pallet which fixedly secure and unsecure, as desired, the vehicle body to the pallet along the path of assembly. These systems require additional components to be added to the pallet and moved along with the pallet throughout the assembly process.

It would be advantageous to improve upon prior systems which secure a vehicle body to a pallet or structure that is moved along an assembly line and to accurately position the pallet and secured body at vehicle build stations. It would be advantageous to have a remote system for selective securing or locking the vehicle body to the pallet which does not require pneumatic or hydraulic mechanisms to actuate components on the pallet to secure the body. It would further be advantageous to design alternate methods for locating and securing the pallet at vehicle stations to better accommodate particular vehicle builds and body styles.

SUMMARY

The present invention includes devices and methods which selectively secure a vehicle body to a movable structure, for example a pallet or platform, that supports the vehicle body as the vehicle is sequentially assembled along an assembly path. In one example, one or more servo motors are fixed in place at selected build stations. The servo motors include a crank shaft which is selectively rotated about an axis or rotation. The movable vehicle body support or pallet includes a body locking mechanism which includes a locking arm and linkage housed in a hollow pillar or riser that supports the vehicle body. When the pallet is moved into a particular process or work station, the pallet is aligned with the motor crank arm such that on rotation of the motor, the crank arm comes into contact and rotates a locking arm which moves the linkage to articulate the body clamp or hook to engage the vehicle body and temporarily lock the vehicle body to the pallet. In one example of the body clamp hook, the linkage connecting the hook to the crank arm includes a compliance member which accommodates build variances and thickness of the sheet metal body to be clamped to maintain positive and repeatable clamping pressure.

In one example, the locking arm is positioned on the top surface of a cross member secured to the pallet. The locking arm is connected to a crank body having an offset crank pin engaged with an elbow of the locking assembly. On rotation of the locking arm, for example 180 degrees, the crank pin is rotated thereby raising a rod positioned in the hollow pillar to articulate the hook through a first portion of a path of travel to raise and position the hook in a raised or open position thereby positioning the hook inside of a hollow locating pin positioned atop the body supporting pillar. In this open position, the vehicle body can be freely installed or removed from the locating pins on the pallet.

To engage and lock the vehicle body to the pallet, the servo motor is reversed in direction and rotates, for example 180 degrees, the locking arm in the opposite direction. This reversal moves the hook through a second portion of the path of travel pulling the hook downward and thereby exposing a portion of the hook outside of the locating pin toward an adjacent portion of the vehicle body to be engaged, for example an exposed flange or hole in a vehicle body component. On completion of rotation of the locking arm back to its original position, the hook engages the portion of the body forcing it downward toward the locating pin and pallet so the vehicle body is secured or locked to the pallet substantially preventing movement of the body with respect to the pallet. To unlock the locking mechanism and remove the body from the pallet, the locking arm is again rotated to an open position disengaging the body clamp or hook from the vehicle body.

In one example of a method of locking the body to the pallet, the pallet on entering a build station may be lowered in a vertical direction to align the servo motor crank shaft with the locking arm. In another example, the servo motor, and structure associated therewith, may be repositioned along the assembly line to align with the pallet and locking arm once the pallet is positioned in the station.

The invention also includes a device and method for accurately and precisely positioning the pallet, or other structure supporting the vehicle body, at a particular build station so additional build and assembly operations can be performed. In one example, several fixed stanchions are used having either a four or two-way receivers. The respective receivers are vertically positioned below predetermined positions under a pallet once the pallet is generally positioned at a work station. In one example, the pallet is lowered and locator pads mounted on the pallet are guided by rollers in the receives to guide and accurately position the pallet in all three dimensions. This provides for an efficient and precise positioning of the pallet and secured body structure thereon.

In an example of positioning the pallet in a build station and locking the selectively locking the vehicle body to the pallet at the build station, the pallet is generally positioned in the build station. If the vehicle body is not already positioned on the pallet, the body is installed on the pallet. The pallet is repositioned, for example lowered, such that locator pads are guided and positioned into one or more receivers which automatically adjust the X and Y dimensional positions of the pallet as the locators come to rest in the receives which support the pallet and thereby position the pallet in the Z-direction as well.

In an alternate example, the build station and pallet are structured and oriented to receive and dimensionally locate the pallet in the X, Y and Z dimensions through an alternate pallet positioning system such as, for example, the system disclosed in the Single Geometry Palletized Framing System described and illustrated in U.S. patent application Ser. No. 12/257,922 assigned to Comau, Inc., assignee of the present invention, the entire contents of which are incorporated herein by reference.

Once the pallet is positioned in a predetermined orientation, the vehicle body is secured and locked in place on the pallet through alignment of the locking motor crankshaft with a locking arm resident on the pallet. On engagement of the motor, the crankshaft rotates the locking arm and through linkage on the crossmember and hollow pillar, articulates a hook connector to engage the vehicle body securely mounting the vehicle body to the pallet. On completion of the build operation, the locking system can be reversed or may remain engaged so the vehicle body can remain secured through sequential build stations and until such time as the body requires removal from the pallet as a completed vehicle or for transfer to another assembly line for further processing.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Figure 1:
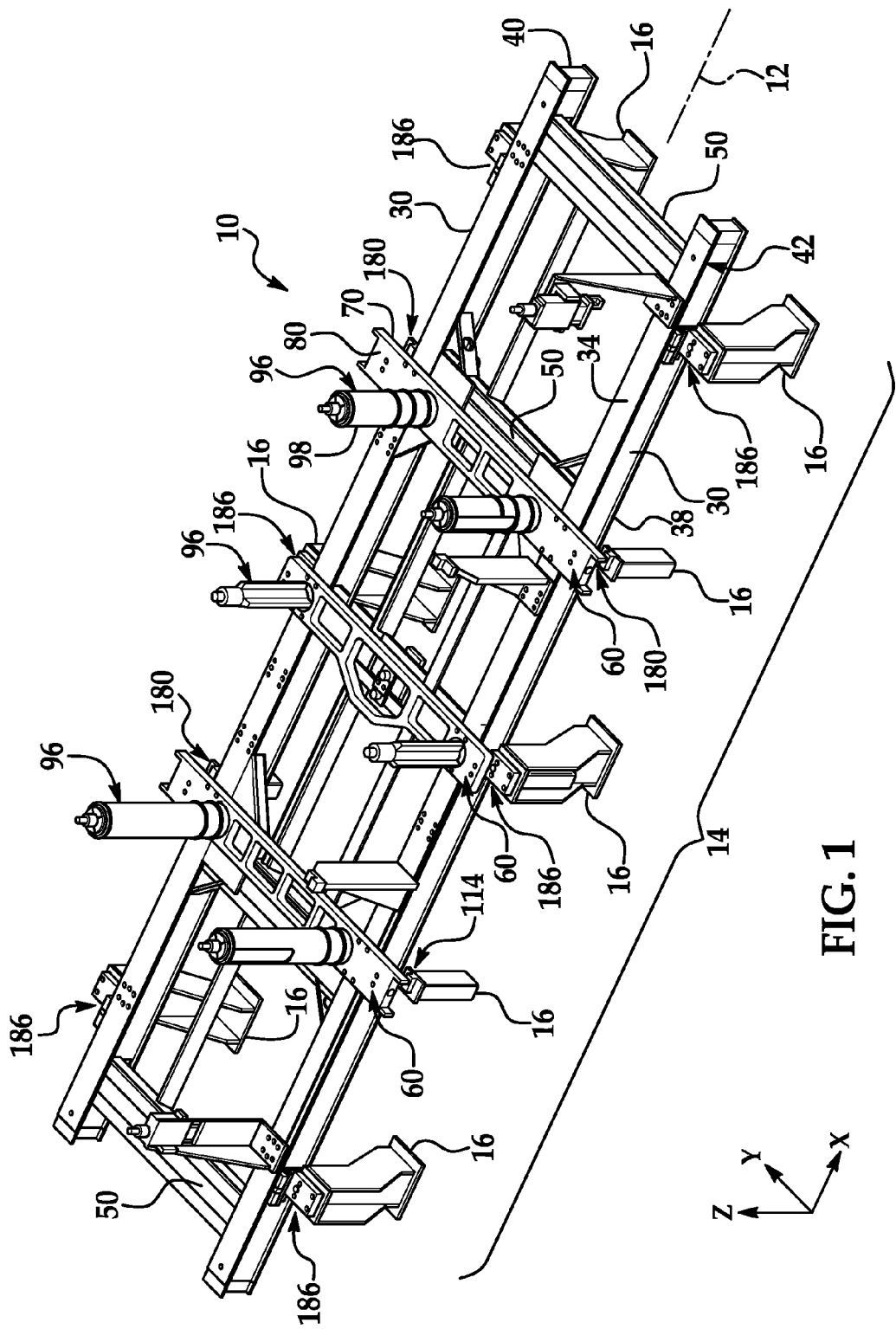
FIG. 1 is a perspective view of an example of the inventive vehicular body assembly pallet apparatus (vehicular body not shown)
Figure 2:
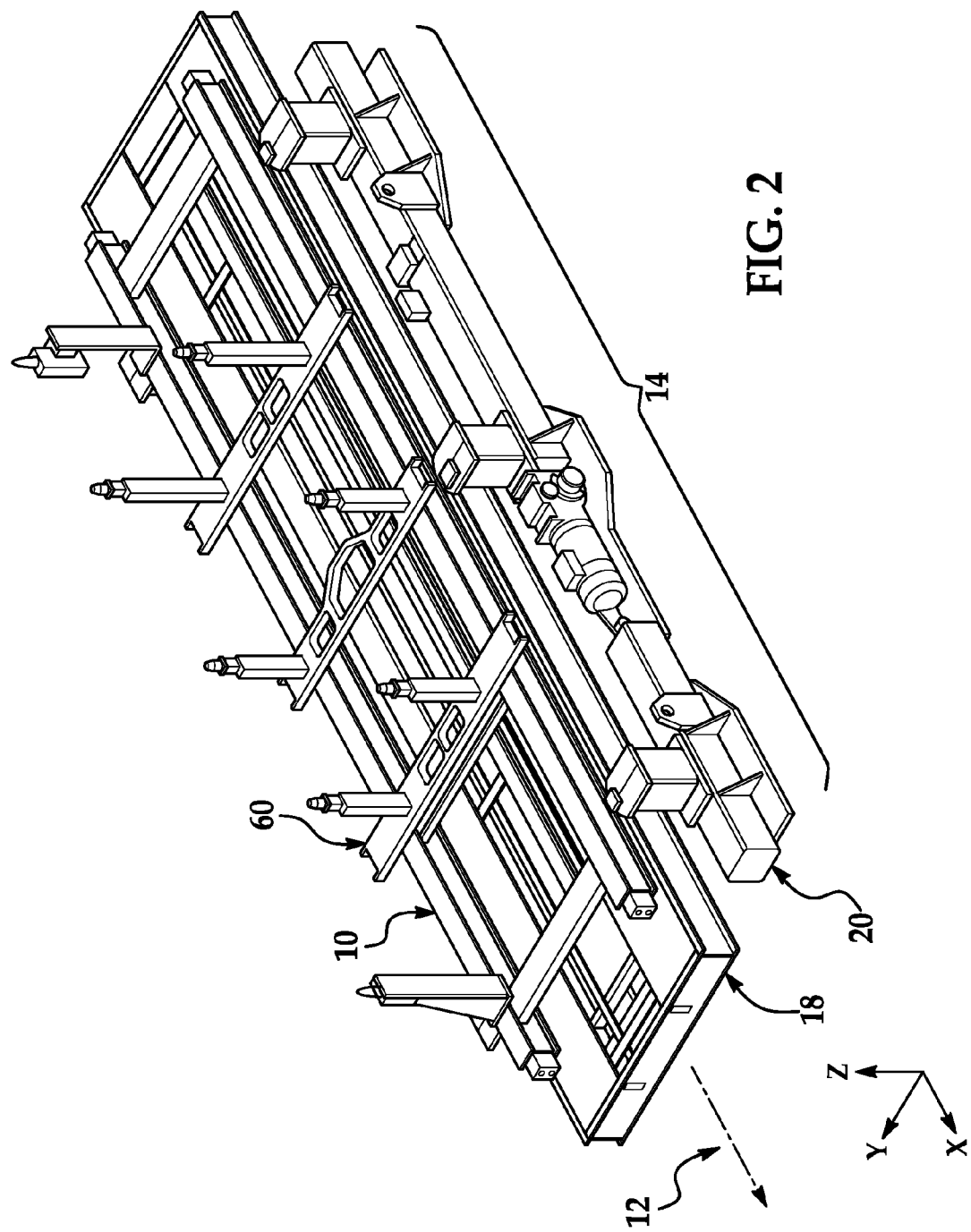
FIG. 2 is a perspective view of the pallet in FIG. 1 positioned at a framing station and further illustrating examples of a roller transport and framer foundation usable with the pallet.
Figure 3:
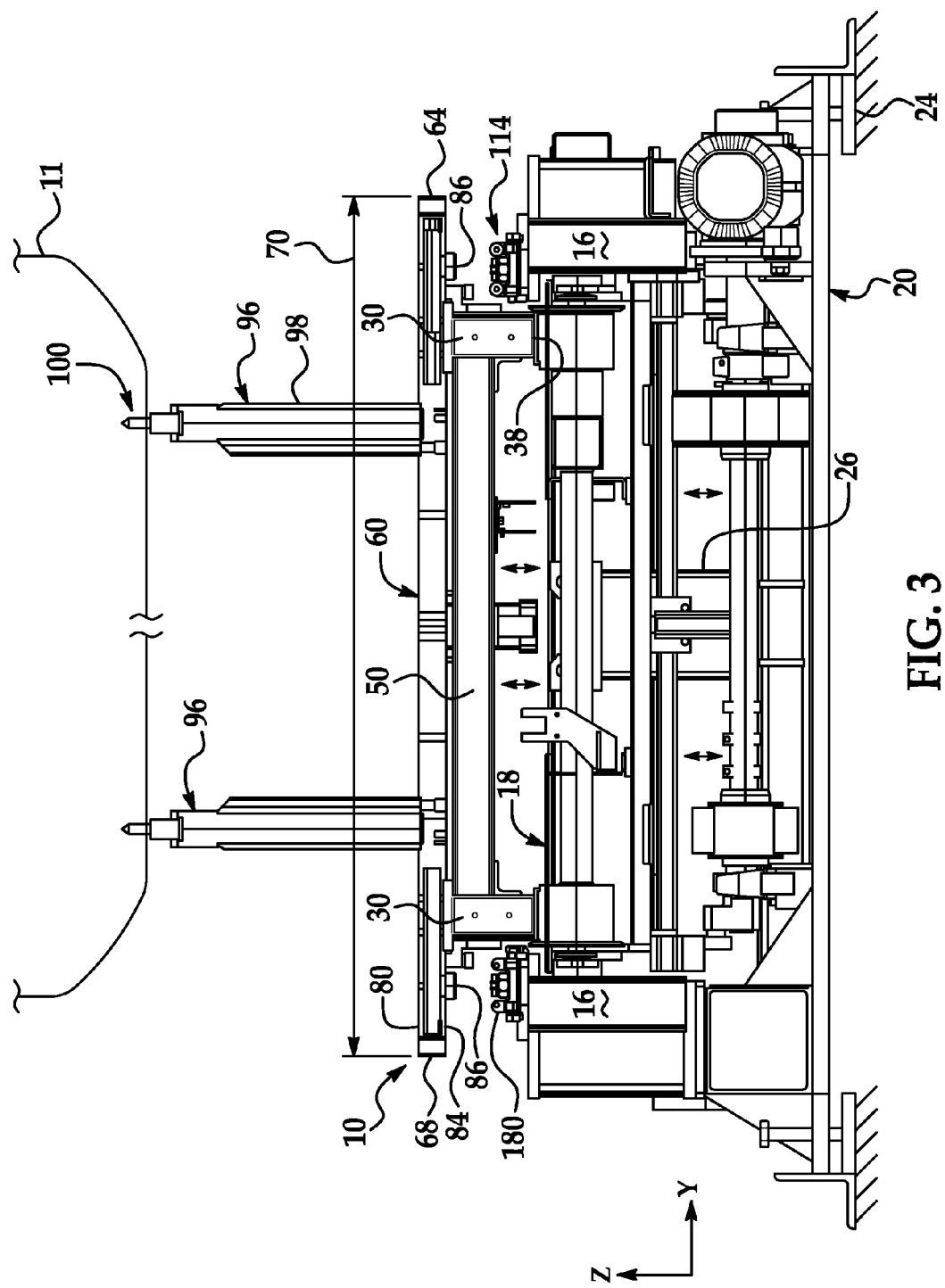
FIG. 3 is an end view of the pallet in FIG. 1 looking upstream along the assembly line.

Examples of the inventive vehicular body assembly pallet system and vehicle body locking mechanism 10 and methods are illustrated in FIGS. 1-22. Referring to FIGS. 1, 2 and 3, a pallet 10 is positioned along a production assembly line 12 and passes through vehicular body framing station area 14 used for welding together loosely assembled vehicular sheet metal body components forming a vehicular body 11 as shown in FIG. 3.

As best seen in FIGS. 2 and 3, in one example, body pallet 10 having a vehicular body shell thereon is typically initially positioned atop a roller transport device 18 which travels down production line 12 through framing station 14. On reaching framing station 14, roller transport 18 is secured into position over a body framer foundation structure 20 which is mounted to the factory floor or other ground support through mounts 24.

Once in position, foundation 20 includes a lowering mechanism 26 which lowers the pallet 10 in a downward or along a Z-directional axis until pallet 10 engages and comes to rest on stanchions 16, described in more detail below, which form a part of foundation 20. Assembly and other welding operations are conducted in the framing station 14 on the vehicular body. Once the assembly and welding operations in framing station 14 are complete, the lowering mechanism 26 is raised and the pallet along with the roller transport 18 is moved down the production line 12 out of framer 14 for further assembly operations. Although a specific roller transport device 18 and framer foundation 20 are shown, other transport and framer foundation devices known by those skilled in the art may be used.

Referring to FIGS. 1 and 3, in one example of pallet 10, pallet 10 includes a pair of longitudinal rails 30 which are positioned substantially parallel to one another and are oriented in a direction along production line 12. In the example illustrated, rails 30 are of a dual-wall, I-beam cross-sectional shape having a top surface 34 and an opposing bottom surface 38 separated by a central wall 40 as best seen in FIG. 1. As shown top surface 34 extend outwardly in a direction transverse to production line 12 beyond central wall 40 forming an upper flange 42. Rails 30 are preferably made from rigid steel, but may be made from other materials, take other forms, and may number greater or lesser than the pair shown to suit the application as known by those skilled in the art.

In the example illustrated, pallet 10 includes a plurality of lateral support beams 50 (five beams shown in FIG. 1) which span between rails 30 and rigidly connect thereto.

Figure 7:
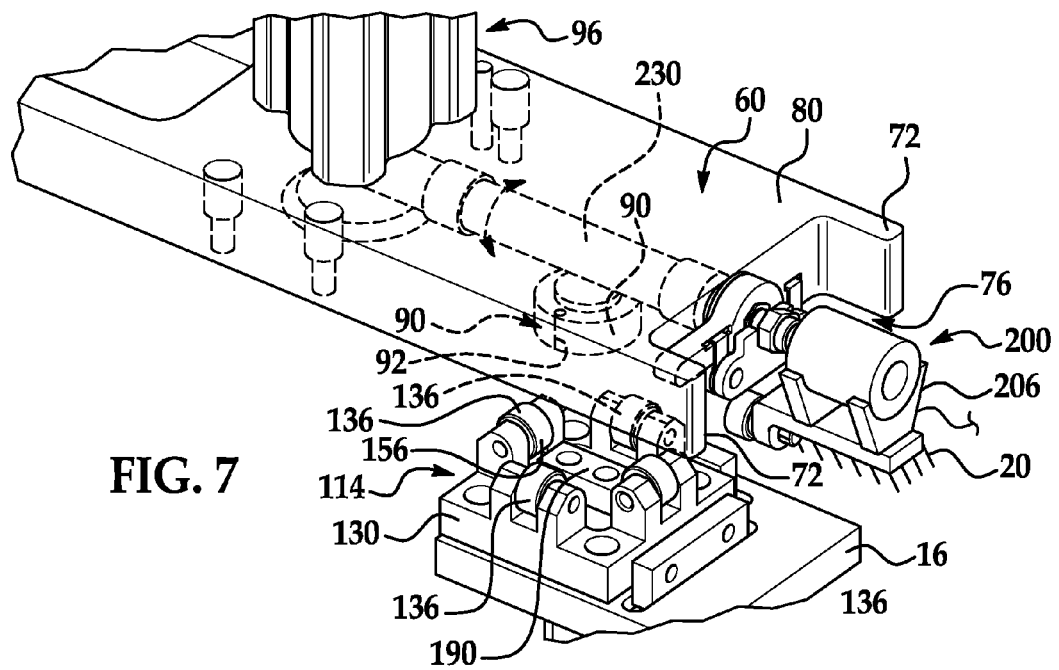
FIG. 7 is a partial perspective view of a portion of the pallet shown in FIG. 1 illustrating examples of an alternate pallet receiver and a locking assembly.
Figure 8:
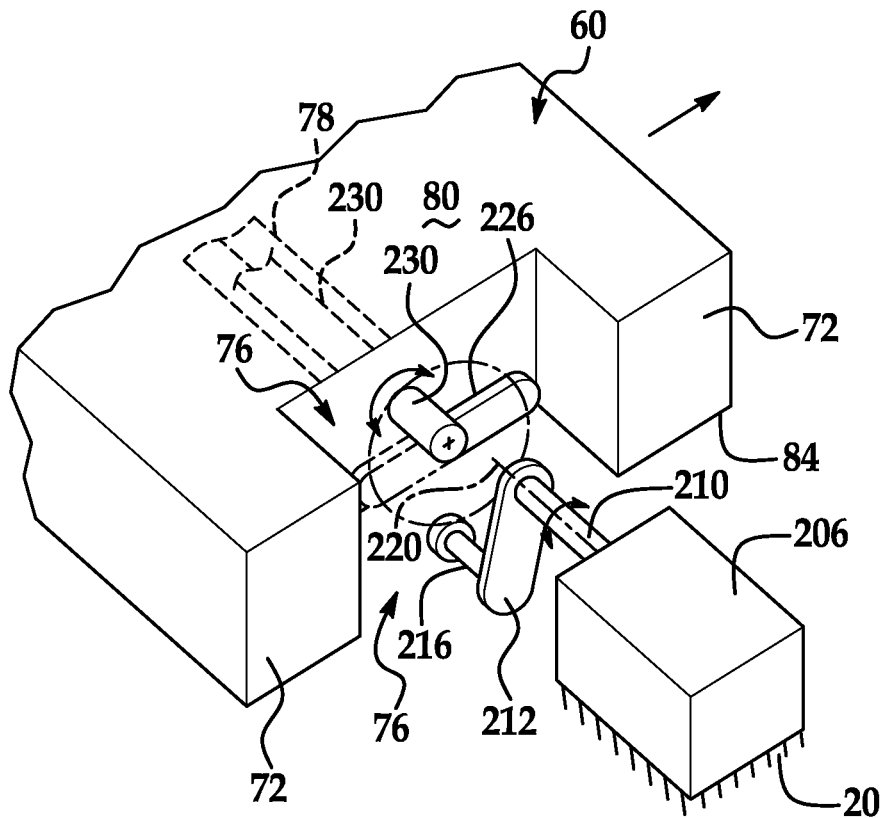
FIG. 8 is schematic partial perspective view of an alternate example of the pallet, pallet receiver and locking assembly shown in FIG. 6.

As best seen in FIGS. 1 and 3, in the example illustrated, pallet 10 includes several cross-members 60 (three shown). In a preferred example, cross-members 60 span between rails 30 substantially transverse to the production line 12 as generally shown. Cross members 60 each include a first end 64 and an opposed second end 68 defining a length 70 as best seen in FIG. 3. As shown in FIGS. 1, 7 and 8, at least one of the first 64 and second 68 ends include extensions 72 extending outward and define a relief opening 76 in communication with a hollow portion 78 leading to a through aperture 85 as best seen in FIG. 10.

Figure 10:
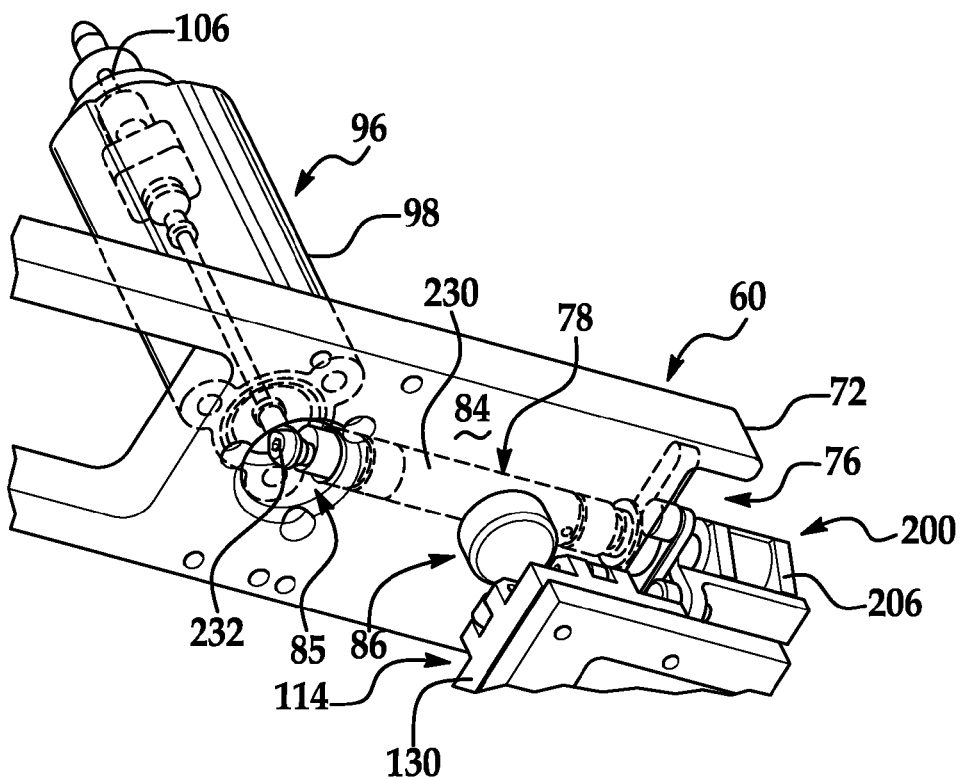
FIG. 10 is an alternate partial perspective view of the pallet shown in FIG. 6 from the underside of the pallet.

As shown in FIGS. 1, 7 and 10, cross-members 60 further includes a top surface 80 and an opposing bottom surface 84. In a preferred example, cross-members 60 are generally rectangular in cross-section and include large through openings to reduce weight and provide clearances for assembly operations were needed. Cross-members 60 are preferably made from solid steel plate but may be made from alternate materials and take other forms and spatial orientations with respect to rails 30 to suit the particular application known by those skilled in the art.

As best shown in FIGS. 3, 7 and 10, pallet 10 further includes a locator pad 86 securely connected to each cross-member 60 bottom surface 84 adjacent the first end 64 and second end 68. In a preferred example, locator pad 86 is cylindrically-shaped having a circumference 90 and a height 92 extending downward in a Z-direction. In a preferred example, locator pads 86 are made from solid steel but may be made from other materials and take other forms to suit the particular application as known by those skilled in the art. In an alternate example, locator pads 86 may be located in positions on the pallet 10 that are not on the crossmembers 60 to suit the particular application and performance specification.

As shown in FIGS. 1, 2 and 3, pallet 10 further includes a plurality of pillars 96 (six shown) for use in directly engaging and supporting the vehicular body 11 at predetermined points designed in the vehicular body panels. In a preferred example, pillars 96 are positioned on the top surface 80 of a respective cross-member 60 and rigidly secured by fasteners (not shown) or by other means known to those skilled in the art.

Figure 11:
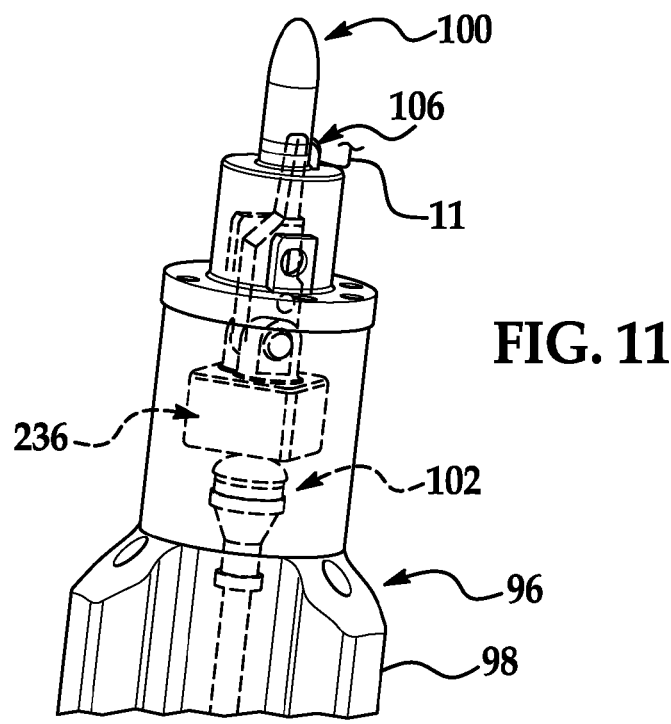
FIG. 11 is a partial perspective view of an example of a pillar shown in FIG. 1.

As best seen in FIGS. 7, 10 and 11, each pillar 96 includes an exterior housing 98 having a hollow center portion 102 ending in a locator pin assembly 100. A vehicle body clamp or hook 106 extends outwardly from the pillar hollow portion 102 and serves to physically clamp and temporarily secure the vehicle body 11 to pallet to and framer foundation 20 while the pallet 10 remains in the framing station 14 as will be described further below. Pillars 96 can be 2-way directional, 4-way directional or fixed positioned pins to suit the particular application as known by those skilled in the art.

Figure 4:
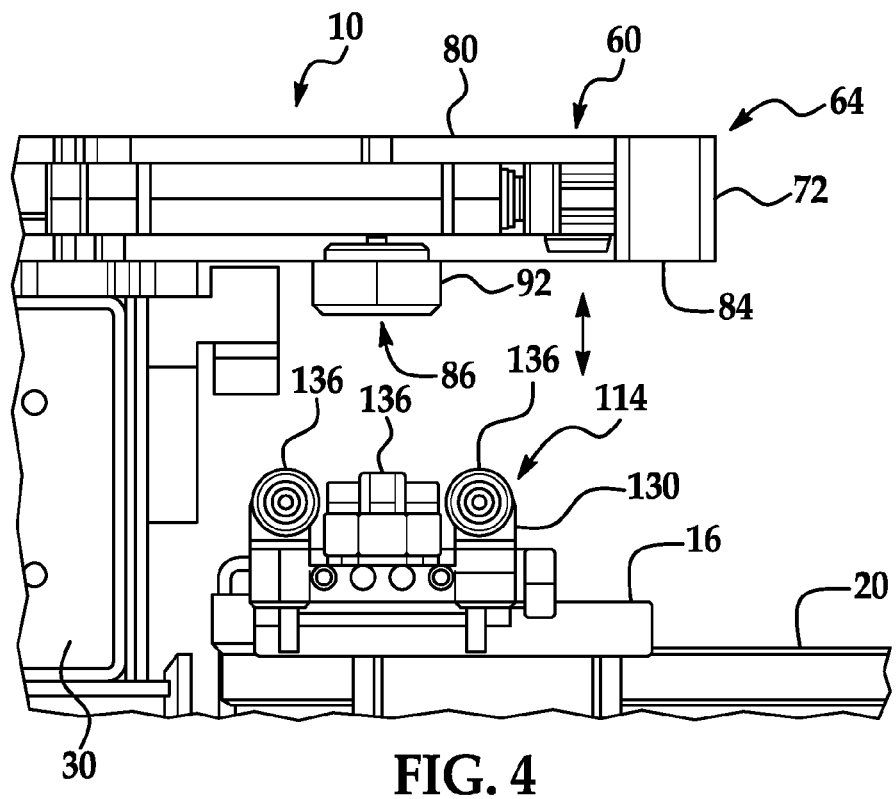
FIG. 4 is an enlarged elevational view of a portion of the pallet shown in FIG. 3.
Figure 5:
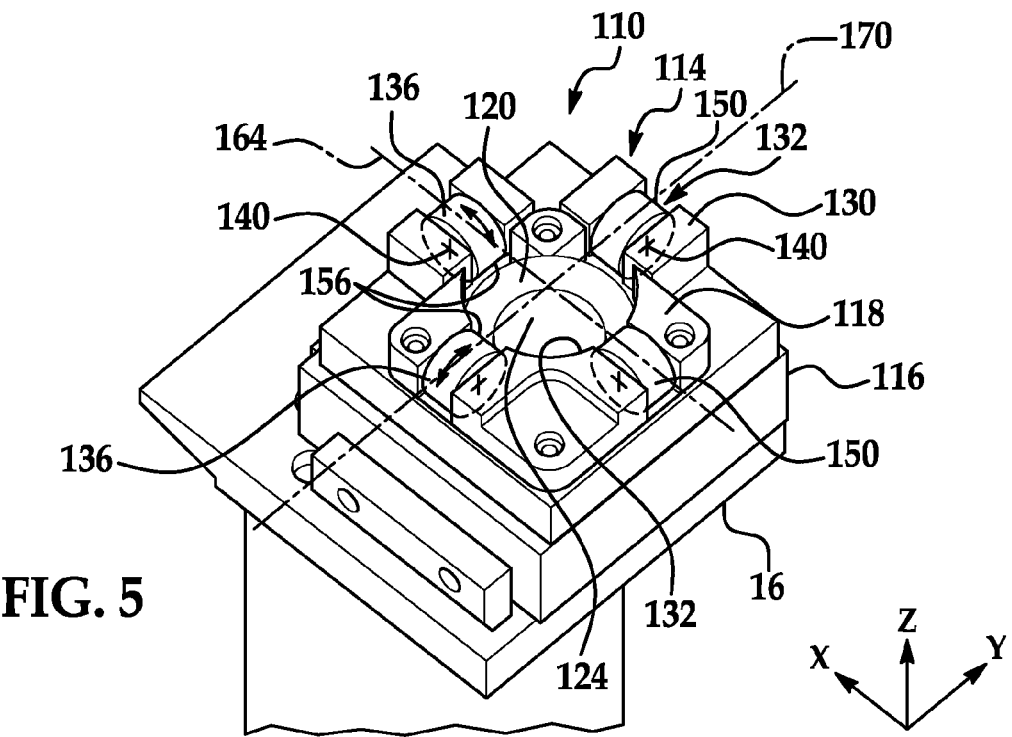
FIG. 5 is a perspective view of an example of a pallet receiver for receipt of a portion of the pallet shown in FIG. 1.

As shown in FIGS. 1, 3, 4-7 and 10 several examples of pallet receivers 110 are shown for use in pallet system 10. Referring to FIGS. 3 and 5, pallet receives 110 are positioned on stanchions 16 and vertically aligned under each of the first end 64 and second end 68 of each cross-member 60, and more particularly under a respective locator pad 86 as best seen in FIG. 4. Pallet receives 110 are used for engagement, support and directional positioning of the pallet 10 with respect to the framer foundation 20 on the lowering of pallet 10 by the lowering mechanism 26 as previously described.

Figure 6:
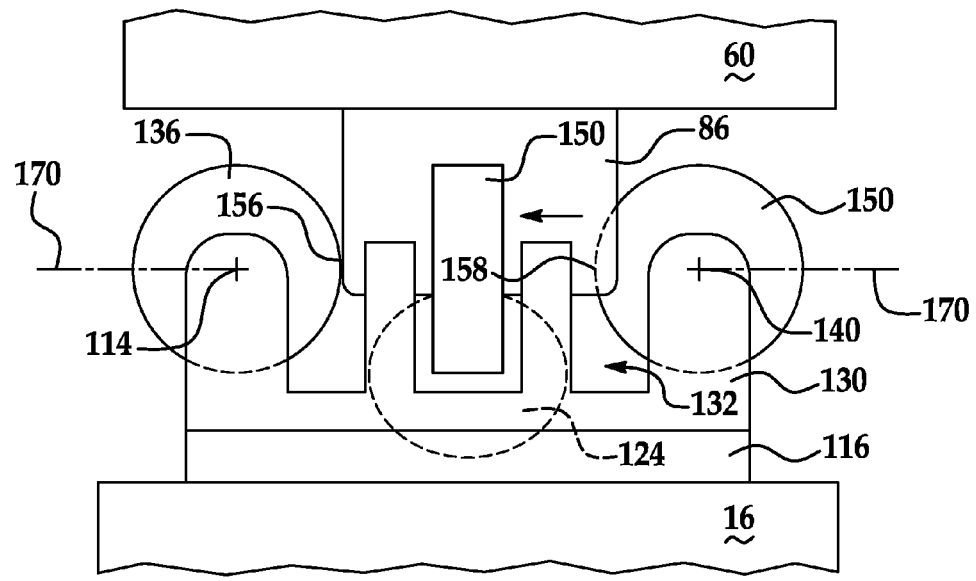
FIG. 6 is a schematic side view of the pallet receiver in FIG. 5 with the pallet engaged with the receiver.

Referring to FIGS. 5 and 6, a preferred example of a 4-way directional pallet receiver 114 is illustrated. Pallet receive 114 includes a receiver base 116 having a socket base 118 secured thereto. Socket base 118 defines a circular-shaped socket 120 for the receipt and engagement of a vertical support 124. In a preferred example, vertical support 124 is in the form of a solid sphere or ball that is captured by socket while allowing omni-directional movement of the support 124 while maintaining its position relative to stanchion 16 and framer foundation 20. Vertical support 124 further provides a dimensionally-fixed support point in the vertical or Z direction on application of downward force on support 124 while simultaneously allowing free movement in the X-Y plane in all directions parallel or transverse to the production line 12. Vertical support 124 in the form of a sphere or ball may be made from solid steel hardened for increased wear characteristics. Other materials, geometric shapes and orientations known by those skilled in the art may be used.

Exemplary receiver 114 further includes roller housing 130 extending above socket base 118 and defining a cavity 132 as generally shown. In the 4-way receiver as shown, housing 130 defines four openings 132 for receipt of four vertically-oriented rollers. In the example, the four rollers include two rigid rollers 136 and two compression rollers 150. Each of the rigid 136 and compression 150 rollers are able to rotate about a respective axis of rotation 140 with respect to the roller housing 130.

Each of the rigid rollers 136 includes a linearly fixed contact point 156 which is defined as the inner most surface or point about the outer circumference of each roller that extends into cavity 132 along either a respective first roller axis 164 or second roller axis 170. Each of the two exemplary compression rollers 150 further includes a compression contact point 158 similarly extending into cavity 132 along the respective first 164 or second 170 roller axes. The circumferential distance between the four roller contact points 156 and 158 is slightly smaller in distance than the locator pad 86 outer circumference 90 thereby creating an predetermined interference fit between the four rollers 136, 150 when the locating pad is positioned in the locator receiver 114 cavity 132 between the rollers as best seen in FIG. 6 further discussed below.

In the preferred example, rigid rollers 136 are made from hardened steel including an internal bearing (not shown) and are substantially radially incompressible along the respective first 164 and second 170 axes. The roller housing 130 prevents movement of the rigid rollers 136 in the other dimensional directions while permitting rotation of the rollers about their respective axis of rotation 140. The compression rollers 150 are preferably molded from durable urethane and exhibit resilient compression properties between the contact point 158 and the axis of rotation 140 (or bearing not shown). Other materials including polymers, elastomers and other materials known by those skilled in the art may be used. It is further understood that the number and respective positioning of the four-way receiver locators 114 and two-way receiver locators 180 may vary in any one receiver 110 to meet the particular application as known by those skilled in the art.

As best shown in FIG. 6, on vertically lowering of pallet 10 toward framing foundation 20, the cross-member 60 locator pads 86 are forcibly positioned into the respective locator receiver 110, illustrated as a four-way locator 114, down into cavity 132 until the bottom surface of locator pad 86 abuts the vertical locator 124 preventing further downward vertical movement of the pallet 10. Due to the predetermined interference fit, namely the locator pad circumference 90 being larger than the roller contact points 156, 158, the two compression rollers 150, slightly compress or yield in the area of contact (shown in phantom) with locator pad 86 and provide a reactive force in the opposite direction along the respective first axis 164 or second axis 170 (illustrated) toward the respective opposing fixed roller 136 thereby forcing movement of the locator pad 86 and the pallet 10 in both axial directions toward the fixed rollers 136. From an assembly and dimensional tolerance perspective, this forcible movement of the pallet 10 against the positionally fixed rollers 136 in both the X and Y directions, enables a substantially zero, or zero, assembly or build tolerance or tolerance stack-up at that point which is an important advantage over prior systems. This assembly and dimensional accuracy and precision translates to the pillars 96 and the vehicular body 11 providing for increased accuracy and precision of assembly and welding of the vehicular body components which carries through to all other components that are subsequently attached to the sheet metal vehicular body 11.

Although not illustrated in detail, the exemplary four-way locator receiver 114, can be in the form of a two-way locator 180 which includes a single fixed roller 136 and an opposing compression roller 150 positioned across cavity 132 in an alternate housing and in alignment along a first 164 or second 170 roller axis depending on the application. In this example, the locator pad 86 would similarly be positioned between rollers causing compression of the compression roller and responsive reactive force forcing the locator pad 86 in a direction toward the opposing fixed roller 136 as previously described.

Although also not illustrated in detail, locator receiver 110 can take the form of a simple vertical or Z-direction receiver 186 which provides no dimensional locating properties in directions parallel to, or transverse to, production line 12. Referring to FIG. 5, such a Z or vertical direction receiver can be in the form of a receiver base 116, socket base 118 and vertical support ball or sphere 124. In use, on lowering of pallet 10 and locator pad 86 onto this form of receiver, only support (or resistance to movement) is provided in the vertical or Z-direction.

An exemplary and preferred use of a combination of four-way receiver locators 114, two-way receiver locators 180 and vertical receiver locators 186 described above is shown in FIG. 1. As shown in FIG. 1, pallet 10 when lowered and until it is no longer supported by the roller transport 18, rests and is engaged by a combination of the four-way 114 and two-way 180 locators, through the fixed 136 and compression rollers 150 and vertical support balls 124, and vertical receiver locators 186 as previously described. As described, such four-way 114 and two-way receiver locators 180 are selectively positioned directly below the cross-members 160 and locator pads 186. In the example illustrated, one four-way receiver locator 114 is used in combination with three, two-way receiver locators 180 and two Z-direction locators 186 to support the six ends of the three cross-members 60 illustrated. FIG. 1 further shows four additional support points of pallet 110 adjacent the distal ends or rails 30 by additional Z-direction receiver locators 186. This combination has been found to provide substantial advantages in the substantially zero, or zero, dimensional tolerance characteristics as described above. Other combinations of four-way 114, two-way 180 and vertical receiver locators 186 to suit the particular application known by those skilled in the art may be used.

Referring to FIGS. 4 and 7, an alternate example of pallet receiver 110 is illustrated. In the example, a four-way receiver locator 114 uses a cluster of four fixed rollers 136 similar in construction and operation as the preferred example shown in FIG. 5 and described above. In the example, an alternate vertical support 190 is used in place of the spherical ball vertical support 124 illustrated in FIG. 5. In the example, vertical support 190 is a rectangular-shaped block that is rigidly fixedly secured to housing 130 but serves the same purpose to provide a fixed stop in the vertical direction to support locator pad 86 and pallet 10. In the example, the fixed contact points 156 defined defining a circumference is slightly larger than the circumference of the locator pad 86 circumference 90 as no compression rollers are used negating use of a purposeful interference fit like the example shown in FIG. 5. The exemplary cluster of fixed rollers 136 still provides an improvement in accuracy and precision in positively positioning pallet 10 and vehicular body 11 with respect to framer foundation 20 over prior designs.

In an alternate example of pallet receiver 110, not illustrated, a pin and bushing design is employed. In the example, a locating pin is affixed to either the cross-member 60 or connected to stanchion 16 and seats inside the receiver or bushing on the opposing piece to position the pallet with respect to the framer foundation 20.

Figure 9:
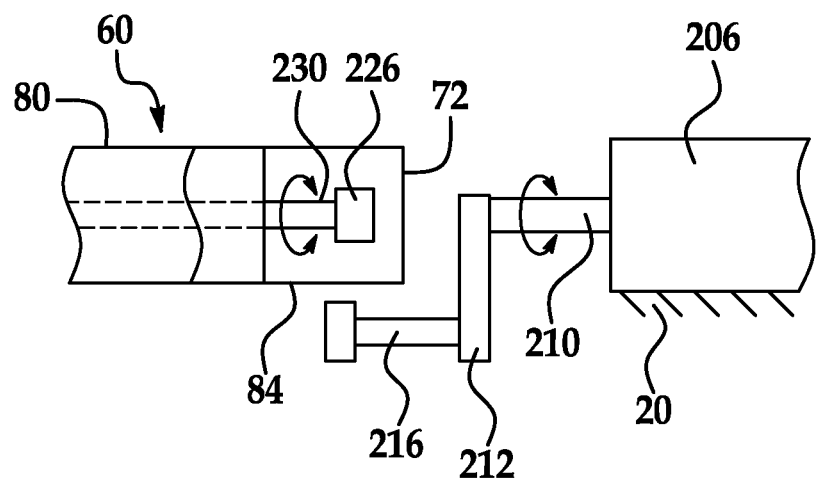
FIG. 9 is a partial side view of the pallet shown in FIG. 8.

Referring to FIGS. 7-10 one example of a remote vehicular body locking clamping mechanism 200 for the vehicular body assembly pallet is illustrated. Referring to FIGS. 7-9, an electric motor 206 is mounted to a portion of the framer foundation structure 20 and includes a rotatable, variable direction output crankshaft 210 which extends transverse to production line 12. Shaft 210 extends to a length that spans the distance between framer foundation 20 and where pallet 10 cross-members 60 pass through along the production line 12, but do not extend to contact or interfere with cross-member 60 extensions 72 as best seen in FIGS. 8 and 9.

Connected to the end of shaft 210 is a link 212 that in the position shown extends beyond the bottom surface 84 of cross-member 60 as best seen in FIG. 9. The length of link 212 is such that on a rotation about the rotational axis of shaft 210, link 212 stays within the width of relief 76 defined by cross-member extensions 72 as best seen in FIG. 8.

A crank arm 216 is connected to the distal end of link 212 and further extends transverse to production line 12 and underneath bottom surface 84 of cross-member 60. In the position illustrated, shaft 210, link 212 and arm 216 do not intersect or interfere with the passage of pallet 10 and cross-members 60 as pallet 10 travels along production line 12 through framing station 14. In a preferred example, electric motor 206 is an electric servo motor and shaft 210, link 212 and arm 216 are made of steel. Other materials, combinations and orientations of these components to suit the particular application.

Referring to FIGS. 7 and 8, pallet system 10 includes a locking actuation arm 226 connected to an axle 230 extending outwardly from cross-members 60 into relief 76 but does not extend outwardly beyond extensions 72 as best seen in FIG. 9. In a preferred example, actuation arm 226 is positioned in substantial axial alignment with shaft 210 of electric motor 200 as generally illustrated. The length of actuation arm is consistent with the length of arm 216 such that when electric motor 206 is activated, arm 216 on sufficient rotation, will contact actuation or locking arm 226 to rotate actuation arm 226. Since electric motor 206 may turn shaft 210 in either direction, the direction of rotation of arm 226 is dependent on the direction of rotation of arm 210.

Axle 230 laterally extends through hollow portion 78 of cross member 60 to through aperture 85 as best seen in FIG. 10. At the distal end of shaft 230 adjacent to aperture 85 is a elbow 232 connected to a clamp linkage 236 leading to body clamp or hook 106 as best seen in FIGS. 10 and 11.

In operation, electric motor 206 is activated to rotate shaft 210 with in turn rotates link 212, crank arm 216 which contacts and forcibly rotates locking arm 226. Through rotation of axle 230, linkage 236 is manipulated to articulate body clamp 106 to clamp body 11 to the pillars 96 and to pallet 10 to avoid unwanted movement of body 11 during operations in the frame station 14. Although described as an electric motor 206, other mechanisms known by those skilled in the field may be used which provide selective rotation of a crankshaft to engage locking arm 226 and articulate body clamp 106 as described. Such systems can be powered by pneumatic, hydraulic or other systems depending on the plant environment and performance specifications required for a particular application.

Figure 12:
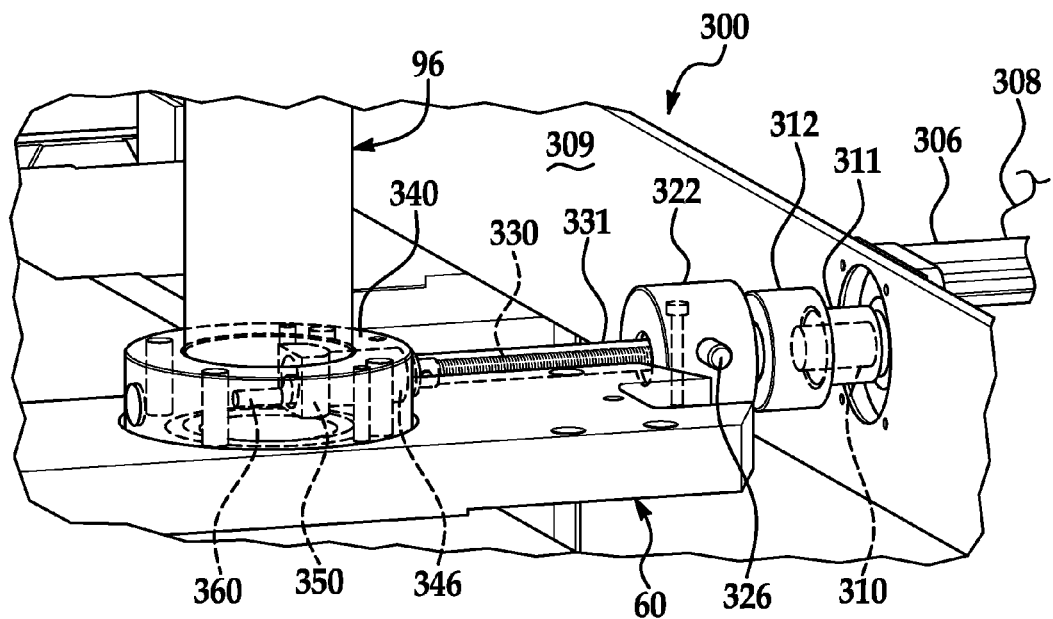
FIG. 12 is a partial schematic perspective view of an alternate example of a locking assembly.
Figure 13:
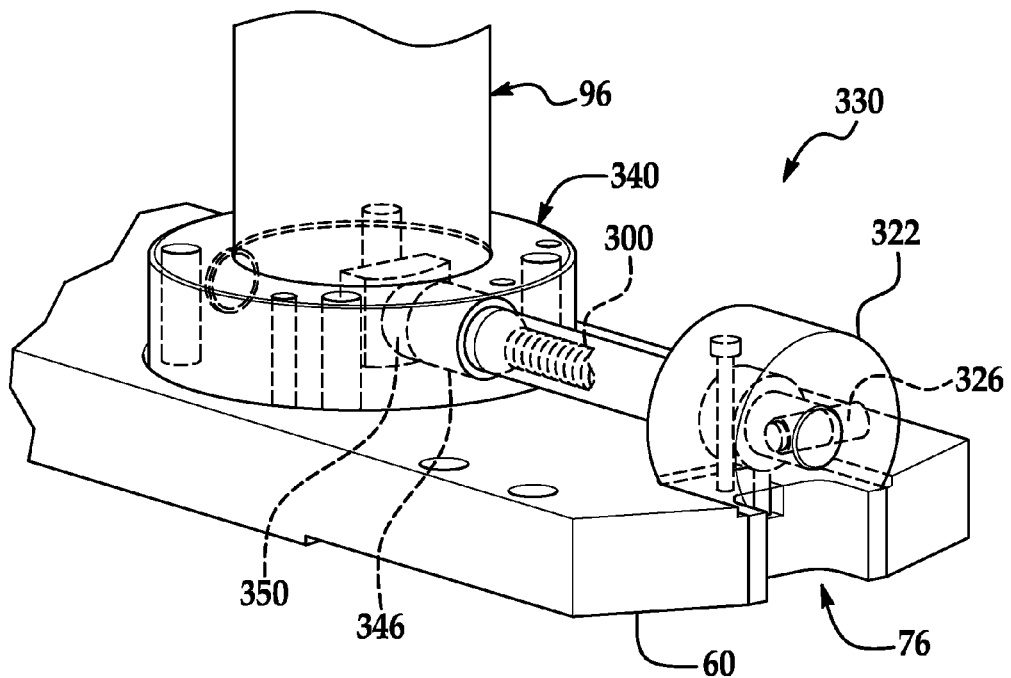
FIG. 13 is an alternate partial schematic perspective view of the locking assembly in FIG. 12.
Figure 14:
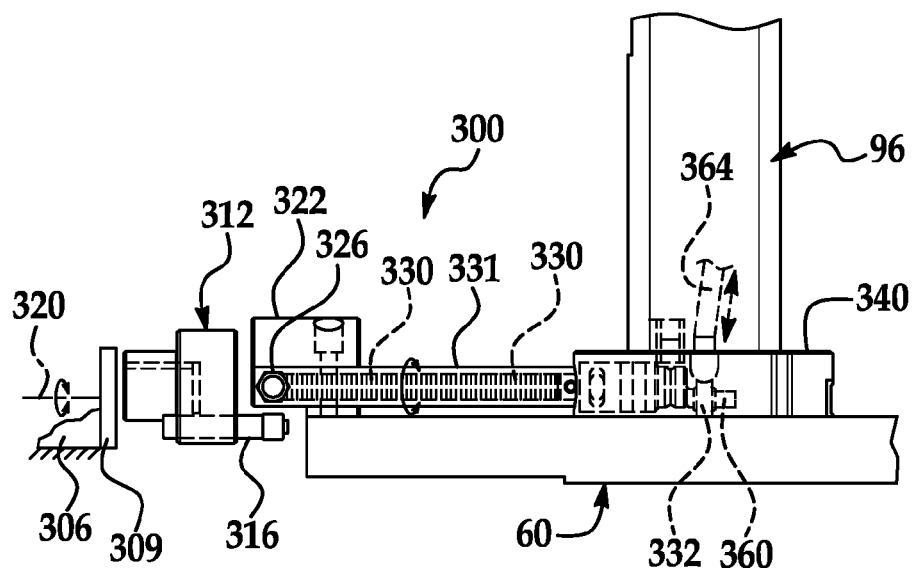
FIG. 14 is a side view of the example locking assembly shown in FIG. 12.

Referring to FIGS. 12-17, an alternate example of a remote vehicular body locking clamp mechanism 300 for the vehicular body assembly pallet is illustrated. Similar components from the prior example may have retained the same number or a new number may be assigned for clarity of explanation and illustration only. Referring to FIGS. 12-14, an actuator 306, shown in an exemplary form of an electric servo motor 306 having a power source 308, is mounted to a portion of the framer foundation structure or a build station (not shown), for example a structural rail 309 positioned along an assembly line path of travel. In the example shown, motor 306 is positioned outboard of rail 309 out of the path of pallet 10.

In the example shown, motor 306 includes a rotatable, variable direction output crankshaft 310 which extends transverse to production line 12 (shown in FIG. 1). As best seen in FIG. 14, shaft 310 extends to a length that spans the distance between framer foundation 20 and where pallet 10 cross-members 60 pass through along the production line 12, but do not extend to contact or interfere with cross-member 60 as it passes through the build station along assembly line 12. In an alternate example not shown, motor 306 and crankshaft 310 may be movable with respect to pallet 10 once the pallet is positioned in the build station to align the motor and related components described below to avoid potential collision with the pallet 10 as it is moved in and out of the build station.

Connected to the end of shaft 310 is a link 312 connected to the crankshaft 310 as best seen in FIG. 14. As best seen in FIG. 14, a crank arm 316 is connected to link 312 and further extends transverse to production line 12 and underneath the immediate structure connected to crossmember 60. In the position illustrated, shaft 310, link 312 and arm 316 do not intersect or interfere with the passage of pallet 10 and cross-members 60 as pallet 10 travels along production line 12 through framing station 14. It is understood that shaft 310, link 312 and arm 316 may be positioned and oriented in a relief 76 in crossmember 60 as described in the previous example. The components and materials used may be the same as the prior locking assembly example or different to suit the particular application or performance specification. For example, although actuator 306, crank arm 316 and locking arm 326 are shown as rotatable members, it is contemplated that a linear actuator 306 may be used to linearly move locking arm 326 to move and articulate the linkage connected thereto to articulate hook 380 in a manner described. Other mechanisms to force movement of the locking assembly in the manner described may be used as known by those skilled in the art.

Figure 15:
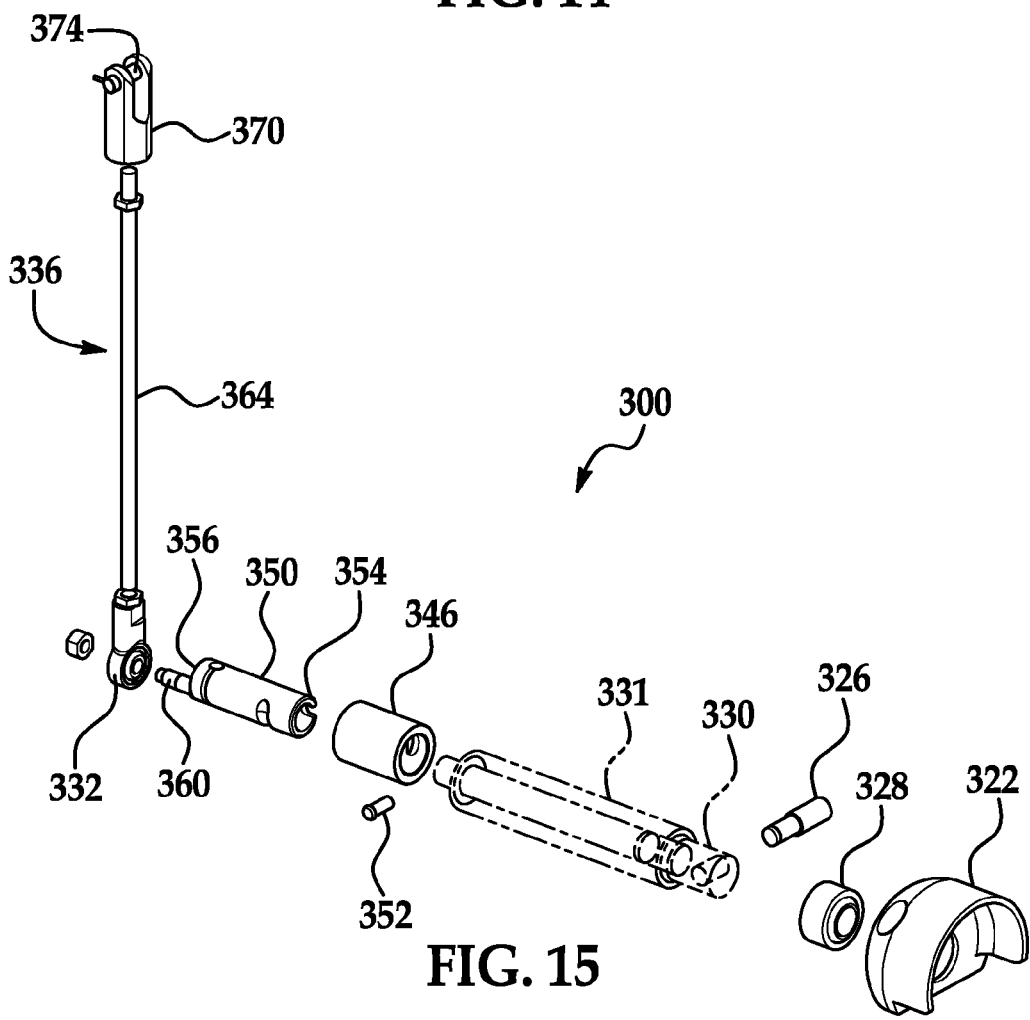
FIG. 15 is an exploded view of a portion of the locking assembly shown in FIG. 12.

As best seen in exemplary FIGS. 13-15 locking system 300 includes a locking or actuation arm 326 connected to an axle 330 positioned on the upper surface of crossmember 60. In the example, locking arm 326 extends outwardly from cross-member 60 above relief 76 but does not extend outwardly beyond extensions 72 as best seen in FIG. 13. In an alternate example shown in FIG. 14, locking arm 326 may extend outwardly beyond the end of crossmember 60. In a preferred example, locking arm 326 is positioned in substantial axial alignment with shaft 310 of motor 306 as generally illustrated. The length of actuation arm 326 is consistent with the length of arm 316 such that when motor 306 is activated, crank arm 316 on sufficient rotation, will contact actuation or locking arm 326 to rotate actuation arm 326. Since motor 306 may turn shaft 310 in either direction, the direction of rotation of arm 326 is dependent on the direction of rotation of arm 310.

In the example shown, locking system 300 includes an awning protective cover or housing 322 which spans and partially surrounds the rotational or radial path of locking arm 326 as best seen in FIG. 13. In a preferred example shown in FIG. 15, a bearing 328 is positioned and connected to the housing for receipt of the outboard end of axle to support the axle end and permit free rotation. Axle 330 laterally extends through hollow portion or cylindrical protective sleeve 331 allowing rotation of axle 330 inside the sleeve as best seen in FIG. 15.

As best seen in FIGS. 12, 13 and 15, locking assembly 300 further includes a bushing 346 mounted in cylindrical hub 340 connected to the crossmember 60. Hub 340 may be an integral part of the pillar 96 or the crossmember 60 or may be a separate component connected thereto.

In the example shown, locking assembly 300 further includes a crankbody 350 having a first end 354 and a second end 356. At the outboard or first end 354, crankbody 350 is connected to the axle 330 by a pin 352 and positioned partially inside bushing 346 in an operative position. At the inboard or second end 356, crankbody 350 includes a crank pin 360 positioned axially below the longitudinal and rotational axis of axle 330 and crankbody 350 as best seen in FIGS. 14 and 15. Crank pin 360 is received by a spherical bearing (not shown) positioned inside elbow 332 as best seen in FIG. 14.

In the example shown, elbow 332 connected to a clamp linkage 336 including a substantially vertical rod 364 extending upward through the hollow pillar 96 as best seen in FIGS. 11 and 14. Rod 364 has left and right hand threaded nuts at opposing ends allowing the length of the rod to be adjusted to suit the particular application.

Figure 16:
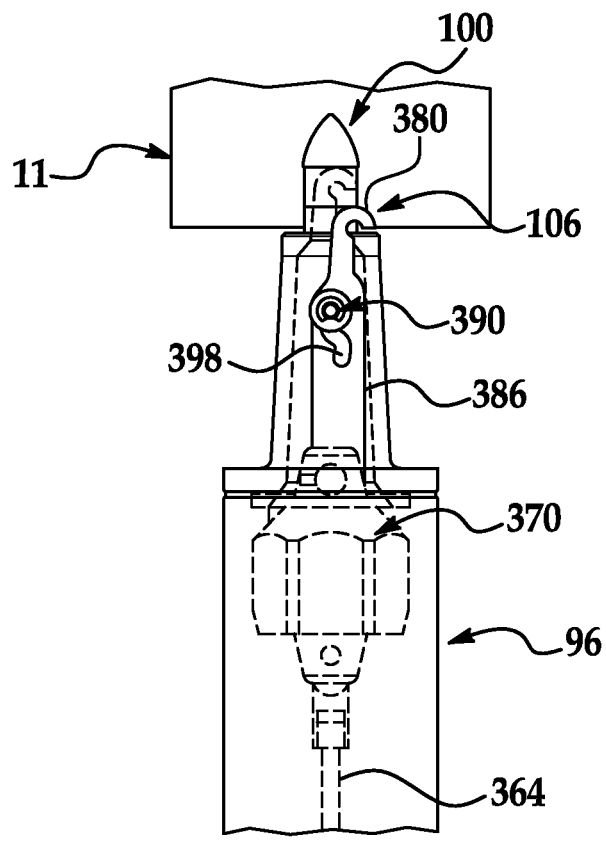
FIG. 16 is a schematic side view of one example of a hook connector usable with the locking assembly shown in FIG. 12.
Figure 17:
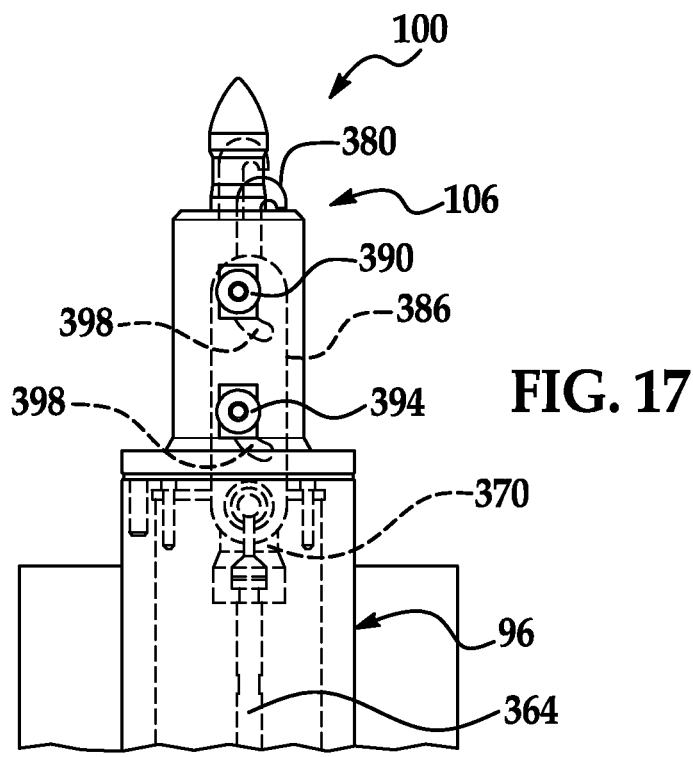
FIG. 17 is an alternate hook connector usable with the locking assembly shown in FIG. 12.

As best seen in FIGS. 15-17, locking system 300 includes a clevis 370 connected to the upper end of rod 364. Clevis 370 is shaped and oriented to receive and connect to a body clamp 106 or hook 380 through a pin 374. As best seen in FIG. 11, clevis 370 and hook 106/370 are housed within hollow locating pin body 100 as generally shown.

As best seen in FIGS. 15-17, in a preferred example, body clamp or hook 380 is connected with one or two cam pins 390 and 394 shown in FIGS. 15 and 16 respectively. Cam pins 390 and or 394 are positioned in respective slots 398 in the respective and coordinating walls of hook body 386 and locating pin body 100 (not shown). The number of cam pins and the shape and orientation of the slots 398 may be varied depending on the articulation needed from the hook 106/380 to engage the body 11.

As best seen in FIGS. 16 and 17, in a preferred example, hook 380 includes two positions defining a path of travel having first and second portions. In a first or open position (shown in phantom), the hook 380 travels along a first portion of the path of travel to a raised position inside the hollow locating pin 100. In this first or open position, the hook 380 is completely or substantially positioned inside locating pin 100 with no portion of the hook extending outside or beyond a perimeter of locating pin 100. A second or closed position is also illustrated (solid line). In this position, the hook 380 moves along the second portion of the path of travel and is pulled and forced in a downward direction from the first or open position. Through articulation of the hook through the second portion of the path of travel, the hook moves downward thereby exposing a portion of the hook outside of the perimeter of locator pin 100 to engage a portion of the adjacent vehicle body (not shown) to force and lock the vehicle body 11 to the locating pin(s) 100 and pallet 10.

Figure 20:
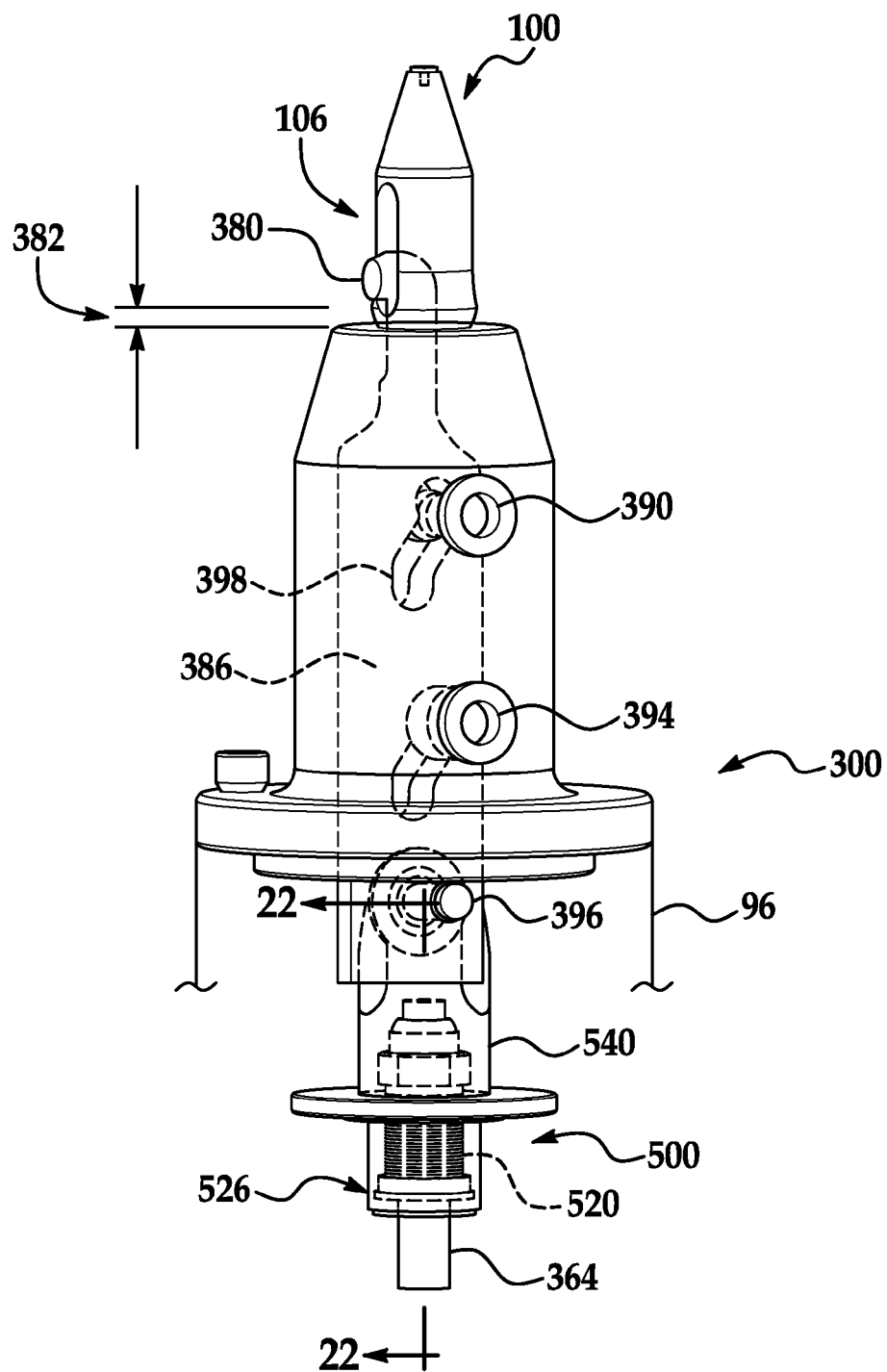
FIG. 20 is a schematic view of an alternate example shown in FIG. 17 illustrating an example of compliance device connected to the hook.
Figure 21:
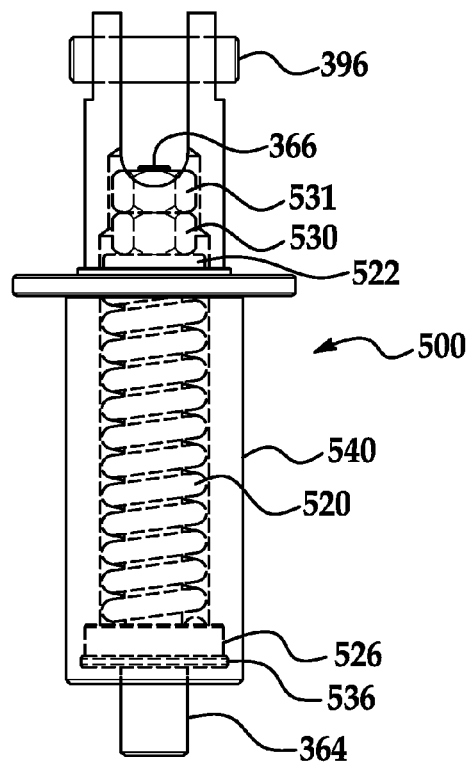
FIG. 21 is an enlarged schematic view of a portion of FIG. 20 showing the compliance device.
Figure 22:
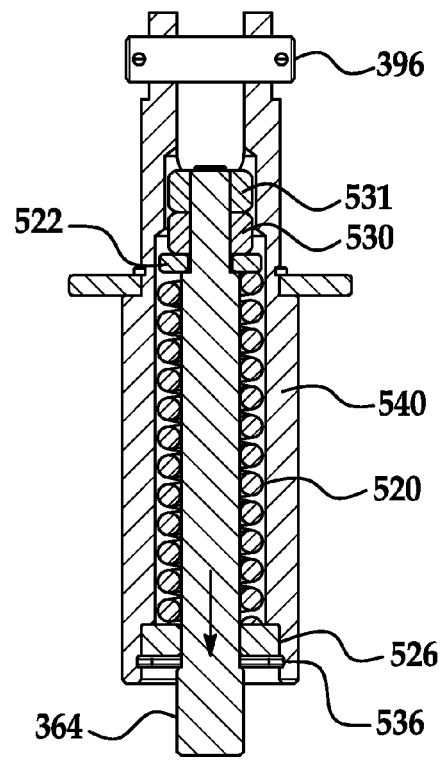
FIG. 22 is a cross-sectional view taken along line 22-22 in FIG. 20

Referring to FIGS. 20-22, an alternate example of locking system 300 is illustrated. Similar components from the prior example may have retained the same number or a new number may be assigned for clarity of explanation and illustration only. In the above described examples, hook 380 is designed to stop short or leave a gap 382 in order to provide a predetermined space or clearance for a thickness (or thicknesses) of sheet metal of the vehicle body to be positioned under the hook and for clamping pressure to be applied. In the above example, gap 382 could be adjusted through the linkage 336 to vary the hook 380 position when at a second position of travel to engage the vehicle body. Once gap 382 was set, the gap 382 remained at that predetermined gap setting. In the event that build variances occur, for example the thickness of the vehicle body sheet metal in the area to be clamped ran thin, this could cause a reduction in the clamping force by the hook 380. Likewise, if the sheet metal ran thick, undesirable high clamping pressure may applied or the hook 380 may not be able to achieve the designed second position affecting the designed-in over-center, locking feature.

In the examples shown in FIGS. 20-22 an example of a compliance device 500 is used to permit the hook 380 to apply the predetermined clamping force (or within a range of acceptable clamping force) on the vehicle body 11 sheet metal despite build or material variances. In the example, compliance device 500 includes a biasing member 520 supported by a base 526 which is positioned within clevis 540 concentrically around rod 364 as generally shown. In the example shown in FIGS. 21 and 22, biasing member 520 is a helical compression die spring positioned concentrically around rod 364 and having a predetermined spring constant. Biasing member 520 is positioned between the base 526 and a cap 522 positioned opposite the base 526.

As best seen in FIG. 22, base 526 is supported within the clevis 540 and in abutting engagement with a locking ring 536 rigidly connected to the clevis 540. A nut 530 and lock nut 531 is threaded onto a threaded end portion 366 of rod 364 to constrain and initially set the compression and permissible travel of biasing member 520 inside clevis 540. The clevis 540 is connected to the hook 380 through a pin 396.

In an exemplary operation where a vehicle body is positioned on locating pins 100 and it is desired for the hook to engage the vehicle body 11, the locking arm 226 is rotated thereby moving rod 364 downward as showing in FIG. 22. This begins movement of hook 380 along the path of travel from a first position concealed in the locating pin 100 (shown in phantom in FIG. 17) toward the second position shown for example in FIG. 17 (shown in solid line). On the hook 380 encountering the surface of the vehicle body 11 sheet metal positioned under the hook 380, the resistive force of the sheet metal stops vertical movement of the hook 380 and therefore, pin 396 and clevis 540 as well. Continued downward movement of rod 364 begins to downwardly compress biasing member 520 against base 526 to apply a compressive force of hook 380 on the sheet metal regardless of build variance or thickness variance of the sheet metal. The compressive force increases on continued downward movement of the rod 364 until the locking arm 226 reaches its predetermined rotation point thereby locking the hook in place, for example an overcenter position or hard mechanical stop, which also achieves a predetermined clamping force applied by the hook 380. Due to the allowable compression of biasing member 520, the hook 380 can achieve the desired clamping force on the sheet metal body despite variance of the thickness of material positioned in the gap 382 or build variances. In one example, the range of effectiveness of the compliance device 500 is 3 millimeters (mm). That is, the compliance device 500 allows the hook 380 to apply substantially the desired clamping force over a range of 3 millimeters in gap 382.

It is understood that compliance device 500 may take different forms other than the example shown. Although biasing member 520 is shown as a compressive, coil die spring, other biasing or compression members known by those skilled in the art may be used. It is also understood that different configurations of device 500 may be used without deviating from the invention. Further, although a preferred compliance range of 3 millimeters is disclosed, other ranges known by those skilled in the art may be used.

In operation, for example to position the hook 380 in an open position, electric motor 306 is activated to rotate shaft 310 with in turn rotates link 312, crank arm 316 which contacts and forcibly rotates locking arm 326. In one example, locking arm 326 is rotated 180 degrees. Through rotation of axle 330, off-center crank pin 360 pushes up rod 364. Clevis 370 and associated cam pins 390/394 move in slots 398 to articulate hook 380 toward a first or open position as described above and shown in phantom lines in FIGS. 16 and 17. In this position, the hook is positioned completely or substantially inside locator pin 100.

Where it is desired to engage and lock body 11 to the pallet 10, motor 306 is reversed in direction thereby rotating locking arm 326 in the opposite direction moving the hook along a second portion of the path of travel toward a second or closed position thereby engaging the vehicle body as described above.

In one example, the motor 306 may stop when hook 380 has maneuvered to the desired location and come and/or placed into abutting and engaging contact with the body to lock the hook, and thereby the vehicle body 11 to the pillars 96 and pallet 10 until such time as it is desired to unlock or unsecure the body 11 from the pallet. It is contemplated that a detent, overcenter or locked position of locking arm 326 may be used (not shown) such that continued force or pressure from the motor 306 and crank arm 316 is not needed to keep the hook 380 in locking engagement with the body.

Figure 18:
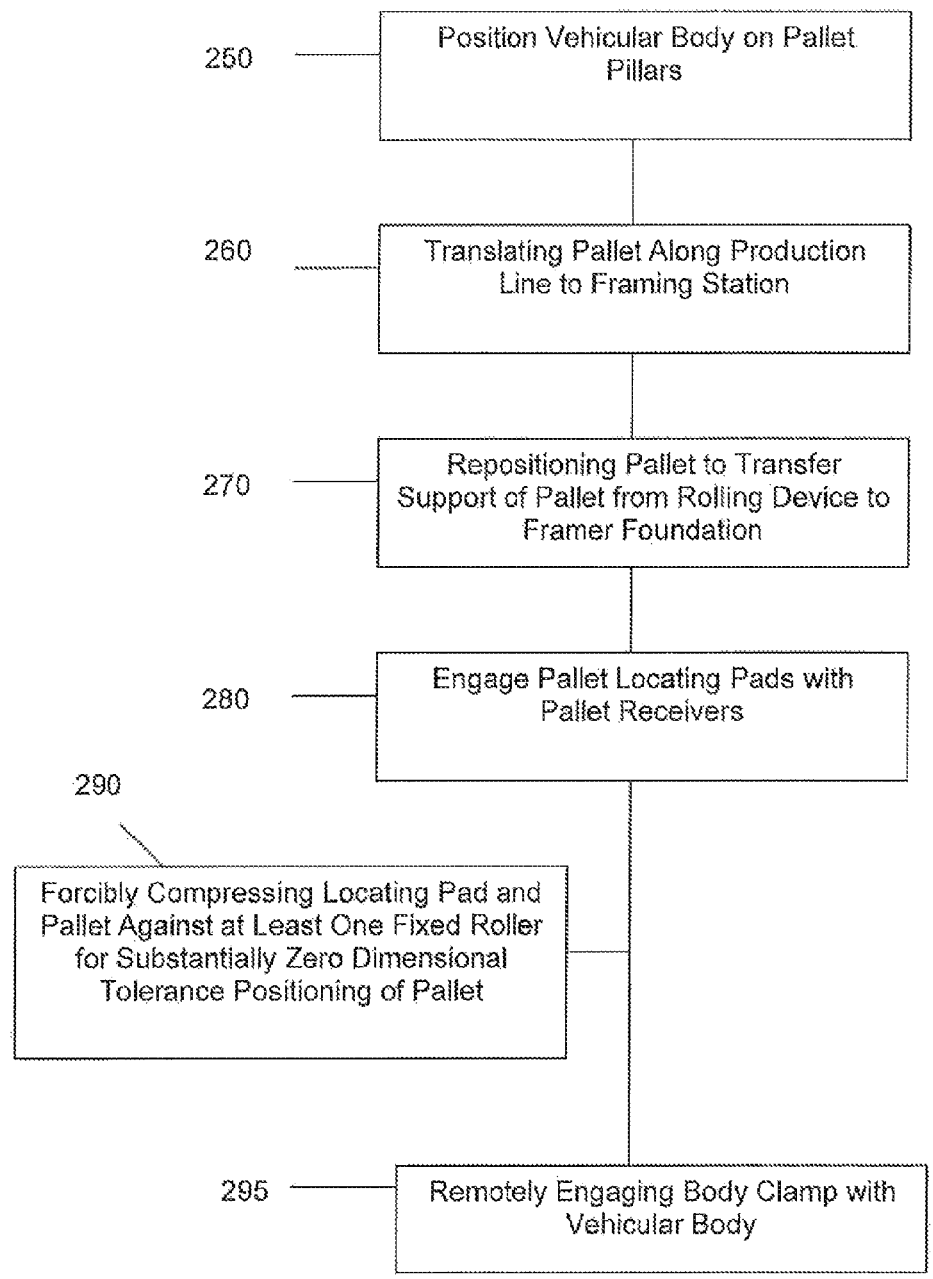
FIG. 18 is a schematic flow chart of an example of the method steps of the present inventive method.
Figure 19:
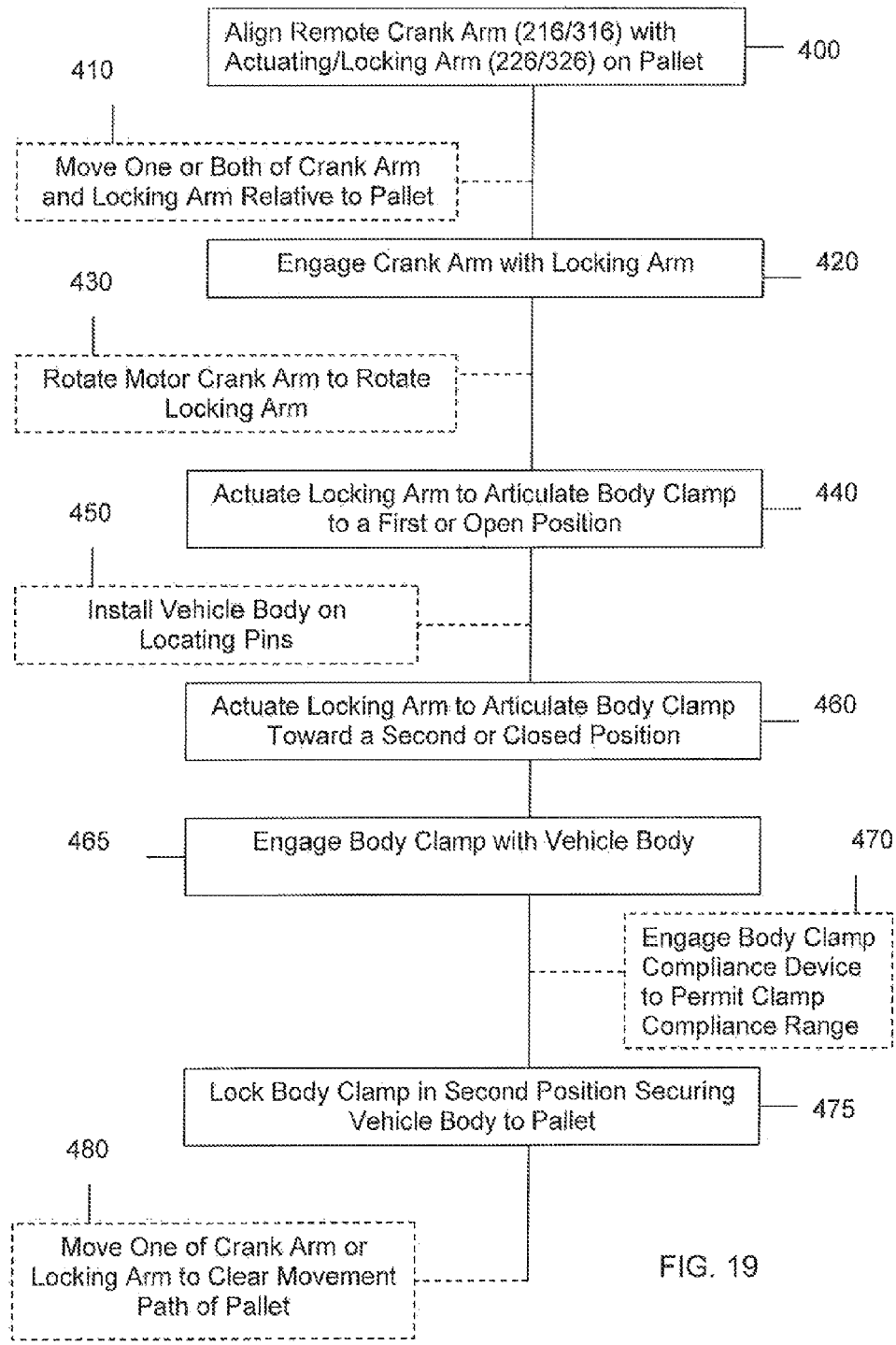
FIG. 19 is a schematic flow chart of an example of the method steps for remotely locking the vehicle body to a pallet or other vehicle body support.

Referring to FIGS. 1-19, schematically summarized in FIGS. 18 and 19, an example of a method of operation of the vehicular body pallet and vehicle body locking apparatus and method for assembling a vehicle body using the same begins with the step 250 of positioning a vehicular body 11 on pallet 10 pillars 96.

Referring to FIG. 18, step 260 includes translating pallet 10 and body 11 along production line 12 and into framing station 14.

Once pallet 10 is positioned in framing station 14, step 270 includes lowering or otherwise repositioning pallet 10 to transfer vertical pallet support from the roller transport to the framing foundation. Step 280 includes engaging the pallet locator pads 86 with pallet receivers. In an alternate step not shown, the pallet 10 is positioned through engaging one or more of the pillars 96 with locators connected to the build station foundation or movable gates that are moved to position the locators next to the assembly line and pallet 10. Using a combination of four-way and two-way locators to engage selected portions of the respective pillars, the pallet is repositioned (if necessary) in the X and Y directions through engagement with the pillars 96 instead of through use of the locator pads 86 or pallet receivers 110/114. This alternate process step is described and illustrated in the Single Geometry Palletized Framing System in U.S. patent application Ser. No. 12/257,922 assigned to Comau, Inc., assignee of the present invention, the entire contents of which are incorporated herein by reference.

In an alternate additional step 290, forcibly compressing one or more locating pads 86 against at least one fixed roller for substantially zero dimensional tolerance positioning of the pallet 10 with respect to the framing foundation 20.

In a final step 295, remotely engaging body 11 with a body clamp 106 to secure the body 11 to the pallet 10 and framer foundation 20 for processing of the body 11 in the framing station 14.

Referring to FIG. 19, an example of a method for locking vehicle body 11 to a pallet 10 (or other vehicle supporting device known by those skilled in the art), is schematically illustrated.

In a preferred example, prior to installing vehicle body 11 onto the pallet pillars, step 400 includes aligning the remote crank arm 216/316 with the actuating or locking arm 226/326 which is positioned on the pallet 10. In one example, the pallet 10 is transferred into a selected build station which generally positions the pallet adjacent orientation with motor 306. In an optional step 410, the structure supporting the motor 306 is moved relative to the pallet and locking arm 226/326 to align the motor crank arm 216/316 such that on actuation of motor 306, the crank arm 216/316 comes in abutting contact with the locking arm 226/326 to move linkage 346 and articulate the body clamp 106/380 to engage the vehicle body. Alternately, the locking arm 326 could be moved or repositioned on the pallet to align with the stationary motor 306 and crank arm 316.

In step 420, once the crank arm 216/316 is aligned with the locking arm 226/326, the motor (or other actuator) is selectively activated to actuate and articulate the body clamp 106/380 through a path of travel. In the examples shown where actuator 306 is an electric motor, in step 430, motor 206/306 rotates crank arm 216/316 to engage and forcibly rotate locking arm 226/326. This in turn rotates axle 230/330. Due to the offcenter nature of crank pin 360, elbow 232/332 is raised (or lowered depending on the direction of rotation of the axle) thereby actuating or raising body clamp/hook 106/380. If another actuator other than a rotating motor is used, for example a linear actuator, an alternate step 430 is used.

In the preferred example shown, in step 440, hook 380 is first moved through a first portion of a path of travel to an open position. As described above, actuator 330 moves locking arm 326 thereby raising hook 380 to be positioned inside locating pin 100.

In optional step 450 a vehicle body may then be installed on locating pins 100 atop pillars 96 connected to pallet 10.

In step 460 the locking assembly moves hook 380 toward engaging body 11. In this step, actuator 306 is reversed in direction to move locking arm 326 in an opposite direction thereby moving the hook 380 from a first or open position to a second or closed position to engage and lock body 11 to the pallet 10. Due to the predetermined use of one or more of cam pins 290/294 in preconfigured slots 300, the body clamp/hook 380 is moved and articulated through a second portion of the path of travel downward and outward from locating pin 100 so as to maneuver and engage vehicle body 11 to lock the body 11 to the locating pins, 100, pillars 96 and pallet 10. For example, an exemplary body clamp 106 may be in the form of a hook 380 to reach into a hole in the vehicle body 11 sheet metal and then be retracted downward so the hook end engaged a sheet metal edge defining the hole. Other body clamp configurations other than a hook may be used to suit the particular vehicle body and application.

In step 465, the hook 380 engages vehicle body 11 and is positioned to apply a clamping force.

In optional step 470, the compliance device 500 is actuated through compression of biasing member 520 to apply a predetermined compressive force on the vehicle body over a range across gap 382 to accommodate variances in the build and sheet metal thickness of vehicle body 11.

In step 475, the body clamp is locked to maintain the desired clamping force on vehicle body 11.

In optional step 480, when the particular build or assembly operations are completed at the framing or build station, the motor 206/306 is activated to disengage and remove the crank arm 216/316 from alignment with locking arm 226/326 so that the motor and crank arm are removed and clearance provides so that the pallet 10 can be moved from the build station down the assembly line for further processing.

It is understood that the above method steps may be altered in order and in sequence as well as addition and alternate steps added to suit the particular application as known by those skilled in the art.

In the pallet system 10 and method illustrated in FIGS. 1-11 and 18, it is a an advantage to have all of the key locating points positioned on the cross members 60 as opposed to additional components, for example rails 30 and/or lateral supports 50, as seen in prior designs. The cross-members 60 in the inventive design include all of the locating holes and attachment points for both of the locator pads 86, both pillars 96 and the resident locator pins atop the pillars with engage body 11, on a single component, cross-member 60. Having the holes and attachment points all on a single cross-member 60 allows for greater accuracy and precision of locating these holes, attachment points and associated critical components that the accuracy and precision of the entire pallet system 10 to greatly improve over prior art designs which located such homes and important components on different components spanning across the entire body support platform thus introducing many more dimensional variations eliminated by the present inventive design and method. Further, by locating the pillars 96 solely on the cross members 60, regardless of the width or spacing between the pillars 96 which is typically dependent on the width or necessary locating points on the body 11, the positioning and/or spacing of the pallet rails 30 and other structural features of the pallet 10 can be standardized so that the same basic pallet can be used across different vehicle body lines with only having to change the cross-members 60 or repositioning the pillars 96 on the existing cross-bars to accommodate different vehicles. In the alternate pallet locating system described, it is further an advantage to locate the pallet 10 in the X and Y directions off of the pillars for substantially zero dimensional tolerance positioning of the pallet.

In the inventive vehicle body locking structure and method, it is a significant advantage to use a remote actuator, for example servo motor 206/306, to actuate a passive mechanical linkage 346 to lock the vehicle body 11 to the pallet 10 without the need for auxiliary power systems to be mounted on, and travel with, the pallet 10.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for remotely locking a vehicle body to a movable vehicle body support located at a vehicle process station, the method comprising the steps of:
    aligning a powered actuator positioned remotely at a vehicle process station with a locking arm connected to a vehicle body support;
    engaging the powered actuator with the locking arm;
    moving the locking arm connected to a body clamp positioned adjacent a vehicle body;
    articulating the body clamp through a path of travel; and
    engaging the body clamp with a portion of the vehicle body to lockingly secure the vehicle body to the vehicle body support.

2. The method of claim 1 wherein the step of articulating the body clamp through a path of travel further comprises the step of pivoting the body clamp about at least one cam pin in engagement with the body clamp and connected to a pillar mounted on the vehicle body support.

3. The method of claim 1 wherein the step of engaging the body clamp with a portion of the vehicle body further comprises the step of:
    engaging a biasing member connected to the body clamp to apply a predetermined clamping pressure by the body clamp on the vehicle body through a range of compliance along the body clamp path of travel.

4. The method of claim 3 wherein the step of engaging a biasing member further comprises the step of compressing a coil spring positioned between an elbow and the body clamp.

5. The method of claim 1 wherein the step of aligning a powered actuator positioned remotely at the vehicle process station with a locking arm connected to the vehicle body support further comprises moving a structure supporting the powered actuator relative to the locking arm and vehicle body support such that on actuation of the power actuator an actuator arm comes in abutting contact with the locking arm.

6. The method of claim 1 wherein the powered actuator is an electric motor and the step of engaging the powered actuator with the locking arm further comprises rotating a motor crank arm to contact the locking arm.

7. The method of claim 1 wherein the step of articulating the body clamp through a path of travel further comprises moving the body clamp to a first open position prior to installing the vehicle body on a plurality of locating pins.

8. The method of claim 7 further comprising the steps of:
    installing the vehicle body on the plurality of locating pins when the body clamp is in the first open position; and
    moving the body clamp to a second closed position to engage the vehicle body and secure the vehicle body to the locating pins.

9. The method of claim 1 further comprising moving one or both of the powered actuator and locking arm to allow movement of the vehicle body from the vehicle process station.

* * * * *